United States Patent [19]
Gaudet et al.

[11] Patent Number: 5,418,767
[45] Date of Patent: May 23, 1995

[54] DETECTION OF OVERUSAGE OF SPARE SECTORS IN AN OPTICAL DISK

[75] Inventors: Andrew A. Gaudet; John E. Kulakowski; Rodney J. Means; David L. Patton, all of Tucson, Ariz.

[73] Assignee: International Business Machines Corporation, Armonk, N.Y.

[21] Appl. No.: 142,027

[22] Filed: Oct. 28, 1993

[51] Int. Cl.[6] .............................................. G11B 7/00
[52] U.S. Cl. ...................................... 369/58; 369/54; 369/55; 369/47; 369/48
[58] Field of Search ...................... 369/55, 56, 54, 58, 369/59, 50, 47, 48, 32; 360/48, 128, 137

[56] References Cited

U.S. PATENT DOCUMENTS

| | | | |
|---|---|---|---|
| 5,088,081 | 2/1992 | Farr | 369/59 X |
| 5,105,427 | 4/1992 | Ando | 371/40.12 |
| 5,111,444 | 5/1992 | Fukushima | 369/58 |
| 5,303,219 | 4/1994 | Kulakowski et al. | 369/58 X |

Primary Examiner—Georgia Y. Epps
Assistant Examiner—Muhammad N. Edun
Attorney, Agent, or Firm—D. A. Shifrin

[57] ABSTRACT

An apparatus and method are provided for tracking the number of permanent and temporary errors, and spare sectors used as a result of the errors, on a per disk and per drive basis. During read/write operations, a determination is made as to whether the number of spares used to replace defective sectors on a disk, together with the number of spares used to replace defective sectors during formatting, exceeds a predetermined limit. This limit can be different depending upon the type of disk in use, rewritable or WORM. If the limit is exceeded, diagnostics are executed to ascertain the cause of the excess usage and appropriate corrective action, such as requesting that the disk and drive lens be cleaned, is initiated. Moreovers, an attempt can be made to recover used spare sectors on a rewritable disk.

14 Claims, 5 Drawing Sheets

DETECTION OF OVERUSAGE OF SPARE SECTORS IN AN OPTICAL DISK

This invention relates to optical storage apparatus and, more particularly, to the detection of excessive spare sector consumption due to lens or disk contamination, media deterioration or hardware failure.

BACKGROUND OF THE INVENTION

Standard erasable and write once (WORM) optical disks may be formatted with several thousand spare sectors per surface. The purpose of the spare sectors is to provide locations for recording data when defects or deterioration in the media, debris on the media or lens, or intermittent or marginal hardware problems create the inability to reliably read and write data. In optical disk technology, the marks that are placed on a disk when data is written may be as small as one micron; therefore a small defect or a dust particle on the disk can introduce an error when reading or writing the data.

Defects in optical disks are generally of two types. One type is within the structure of the disk itself, is caused during manufacturing and is referred to as a permanent defect. Erasable magneto-optical (MO) disks are more prone to such permanent defects than many other types of media since MO disks are produced with layers of reactive materials such as terbium, iron and cobalt. These active layers are covered with transparent plastic material designed to be impermeable to oxygen and moisture which can cause a permanent defect if they reach an active layer. Such defects typically occur during the manufacturing process but can also arise later during use of the disk if moisture or oxygen reach the active layers during use. Moreover, such defects tend to grow over time. Consequently, if a defect is initially present in an active layer such that only one bit of data in one sector is affected, that defect can grow over time to affect additional bits of data in that sector or adjacent sectors.

A second type of defect creating problems in reading and writing data is contamination due to dust or debris and is referred to as a temporary defect. When a large enough particle of dust lights upon the surface of a disk or drive lens, the laser beam is diffused or blocked and the disk cannot be reliably written or read, if at all, at that particular location. Temporary defects created by a dust particle generally do not grow in size but can move across the surface over time as the dust particle moves. Such defects can also, in many instances, be removed by cleaning the disk and/or lens surface(s).

Intermittent and marginal hardware problems can also cause data access to be unreliable. For example, an intermittent circuit fault in the write channel of the drive system can generate faulty data which is then stored on the disk. Error correction code (ECC) may be able to correct the data but it may not necessarily meet a very high criteria for data correction and therefore be deemed unreliable. Similarly, a low output signal from the read channel could also make the data appear marginal even though the ECC might be able to correct the data.

The effect of a defect on a disk can be the same whether it be due to a permanent defect in a active layer or a temporary dust or hardware defect. Conventional optical disk systems can only detect the presence of an error but are unable to determine the cause. Moreover, even when detected, an error can make it difficult or impossible to correct data that is written on the disk through error correction codes. Therefore, it may be necessary for the data to be moved to a dedicated area on the disk containing spare sectors and the original sector marked as defective. If a spare sector is also defective or contaminated by dust, it becomes necessary to move the data to still another spare sector. It is evident that dust contamination and media defects can rapidly consume spare sectors. It is also evident that, with only a limited number of spare sectors, and with each error requiring the use of one or more spare sectors, spare sectors can be quickly exhausted. Clearly, an optical disk can be rendered unreliable or useless if all, or even most, of the spare sectors have been filled.

OBJECTS AND SUMMARY OF THE INVENTION

In view of the foregoing, it is an object of this invention to track and analyze the usage of spare sectors on optical media and flag overusage.

It is a further object of this invention to track and analyze the usage of spare sectors and flag overusage.

It is still a further object to track and analyze the usage of spare sectors, determine the cause of any overusage and to initiate appropriate corrective action. These and other objects are achieved in this invention by an apparatus and method for tracking the number of permanent and temporary errors, and spare sectors used as a result of the errors, on a per disk and per drive basis. During read/write operations, a determination is made as to whether the number of spares used to replace defective sectors on a disk, together with the number of spares used to replace defective sectors during formatting, exceeds a predetermined limit. This limit can be different depending upon the type of disk in use, rewritable or write-once (WORM). If the limit is exceeded, diagnostics are executed to ascertain the cause of the excess usage and appropriate corrective action, such as requesting that the disk and drive lens be cleaned, is initiated. Moreover, an attempt can be made to recover used spare sectors on a rewritable disk.

The foregoing and other objects, features and advantages of the invention will be apparent from the following more particular description of the invention, as illustrated in the accompanying drawing.

RELATED APPLICATION

This application is related to copending and commonly assigned U.S. application Ser. No. 07/756,729 filed Sep. 9, 1991, entitled RECLAMATION OF DUST CONTAMINATED SECTORS IN OPTICAL DISK APPARATUS, by Kulakowski, et al.

DETAILED DESCRIPTION

Figure 1:
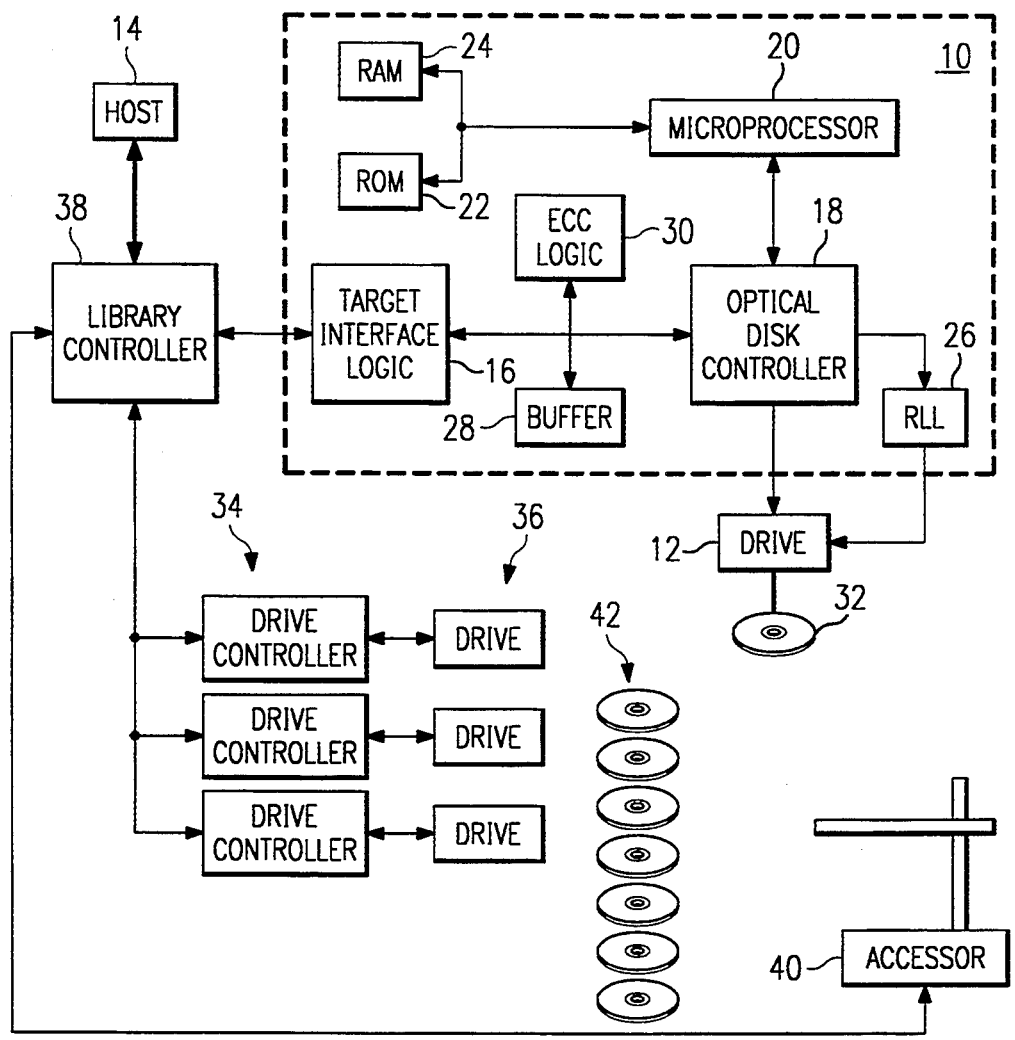
FIG. 1 is a block diagram of a system attachment controller for an optical disk drive utilizing the present invention.

FIG. 1 is a block diagram of a controller 10 for a peripheral device, such as an optical disk drive 12, interconnected with a host processor 14. The controller 10 includes target interface logic 16, an optical disk controller 18 and a microprocessor 20. Read only memory (ROM) 22 and random access memory (RAM) 24 are associated with the microprocessor 20. A run length limited (RLL) circuit 26 passes data to and from the drive 12. A buffer 28 provides storage for data and an error correcting code (ECC) logic circuit 30 provides corrections to the data contained in buffer 28. An optical disk 32 is loaded into drive 12 for data access.

The microprocessor 20 is the system manager for the controller 10. It controls the optical disk controller 18, interprets commands and monitors the ECC logic 30 through the optical disk controller 18. The optical disk controller 18 controls the ECC encoding/decoding and the data buffering process. ROM 22 provides for local control storage for the microprocessor 20 while RAM 24 provides working storage to the microprocessor 20. The target interface logic 16 receives commands and data from the host processor 14.

The controller 10 and drive 12 can be interconnected directly with the host 14 or, as illustrated in FIG. 1, can be incorporated into an automated storage and retrieval library system. In addition to the controller 10 and drive 12, the library includes one or more additional controller and drive units 34 and 36 interconnected with the host 14 through a library controller 38. The library controller 38 processes data access instructions from the host 14 and directs a disk accessor 40 to retrieve a desired disk from an array of stored disks 42 and mount the disk in a selected drive in the bank 36. Upon completion of the data access, the library controller 38 directs the accessor 40 to remove the disk from the selected drive 36 and replace it in the array 42.

Figure 2:
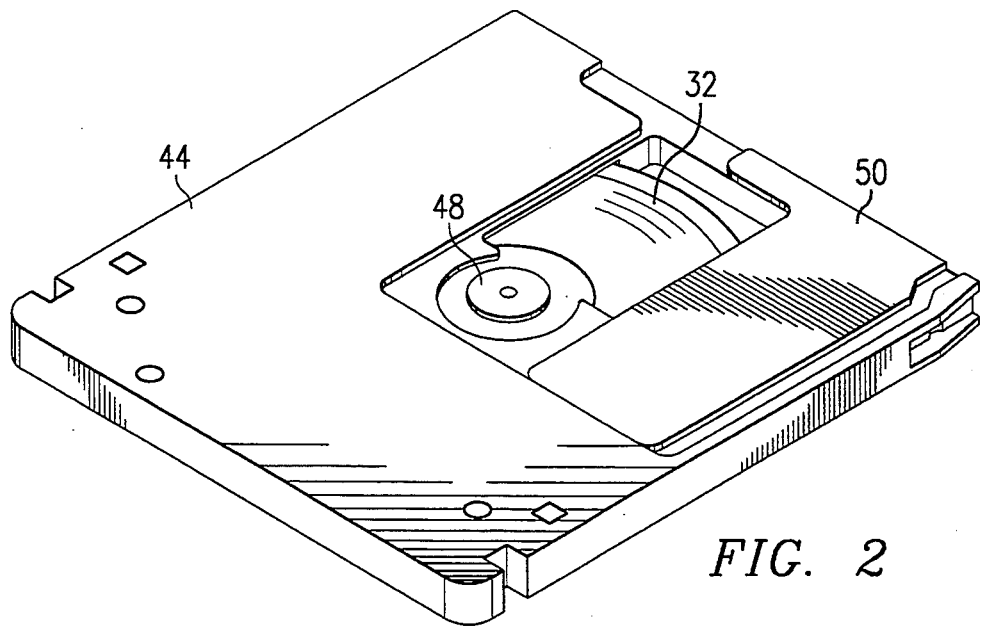
FIG. 2 illustrates an optical disk cartridge.

FIG. 2 illustrates an optical disk cartridge for use in the disk drive 12 interconnected with the controller 10 shown in FIG. 1. A cartridge housing 44 contains the optical disk 32 mounted on a hub 48. A shutter door 50 on the cartridge 44 is shown in an open position so as to reveal the disk 32. When the shutter door 50 is in its closed position, dust cannot enter the cartridge 44 and light on the disk 32, but when the shutter door 50 is open, as it must be for a read/write head to access data on the disk 32, dust can infiltrate the cartridge 44 and contaminate the surface of the disk 32.

Figure 3:
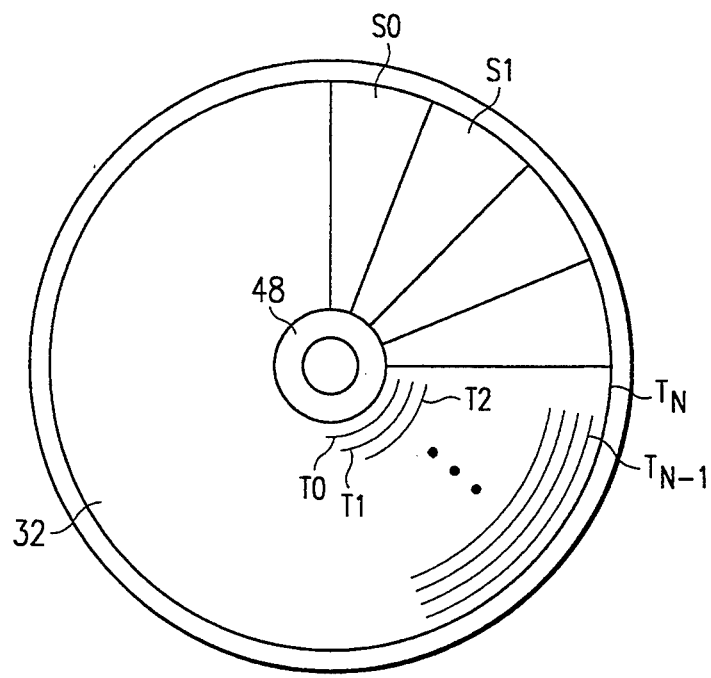
FIG. 3 is a schematic illustration of a configuration of tracks and sectors of the optical disk in the cartridge of FIG. 2.

FIG. 3 is a schematic illustration of a track and sector configuration of the optical disk 32. Track T0 is shown as the innermost track on the disk 32 and is located close to the disk hub 48. Track numbering proceeds outwardly from the innermost track T0 to an outermost track Tn. In optical disk technology, it is common to provide tracks in a continuous spiral but tracks may alternatively be concentric to each other. The disk 32 is logically divided into sectors such as sectors S0 and S1. It is common practice to provide seventeen equal angularly spaced sectors around each track.

Figure 4A:
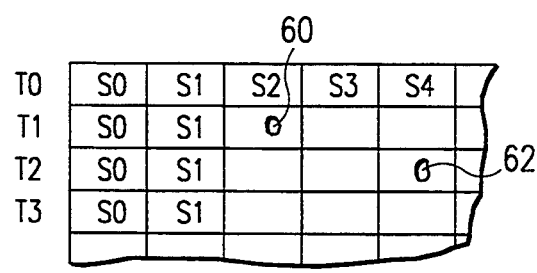
FIG. 4 comprised of FIGS. 4A and 4B, is a diagrammatic layout of tracks and sectors with illustrative defects.
Figure 4B:
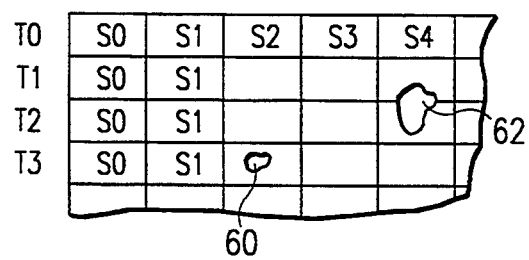

FIGS. 4A and 4B illustrate a diagrammatic layout of tracks and sectors on disk 32. Marks written or read on the disk 32 are typically about one micron in size and are separated from adjacent marks by about one micron. There are typically thousands of marks in a sector along each track. FIG. 4A shows a temporary defect 60 at sector S2 on track T1, and a permanent defect 62 at sector 4 on track T2. When data is written to the disk 32, the data is verified with a high criteria to assure that over time, the data can be reliably retrieved. Data integrity is similarly verified during a read operation.. If the data does not meet the test criteria, as can occur if a defect 60 or 62 is large enough, the data on the defective sectors, or intended for these sectors, are moved to a spare sector.

FIG. 4B is similar to FIG. 4A and illustrates what frequently happens with the two types of defects over the course of time. Note that the temporary defect 60 is no longer at sector S2, track T1, but rather has moved to a different sector S2 on track T3. A moving defect, such as defect 60, is due to a dust particle moving across the surface of the disk 32.

The other defect 62 at S4, T2, is a small permanent defect in FIG. 4A, perhaps too small to cause the loss of any data at the time of initial format. However, as FIG. 4B shows, the defect 62 has grown in size over the course of time and can create a problem in adjacent track T1 in sector S4. Growth of the defect 62 is typical of defects in the reactive layer of the disk 32. Because optical disks are used for mass storage, they are often expected to last for many years, creating ample opportunity for the growth of permanent defects. As previously noted, dust particles on an optical lens inside the drive 12 and hardware faults can also cause unreliable sectors.

The present invention identifies sectors that are contaminated by dust and sectors that are affected by reactive defects. To make that determination for MO media, defects initially are detected when the MO disk is inserted for the first time into a drive and formatted. In the formatting operation, test data is written to, then read from, each data sector on the disk. Thus, it can be ascertained during the initial MO mount which sectors are defective. It is assumed that these defective sectors are due to defects in the active material of the disk rather than dust, because the disk cartridge remained sealed prior to first use. It is also assumed that some of these defects will probably grow over a time. Such growth occurs in all directions, that is, a defect can expand along the original track from bit position to bit position, and can also expand onto sectors on adjacent tracks.

When WORM media is formatted, areas on the disk containing the spare sectors are identified but, because of the non-rewritable nature of WORM, no test data are written. Therefore, defects are not detected during formatting. Defects are, however, detected during actual write operations. If a sector is found to be bad during verification following a write, the data is rewritten in the first available spare sector in the spare sector area.

Figure 5:
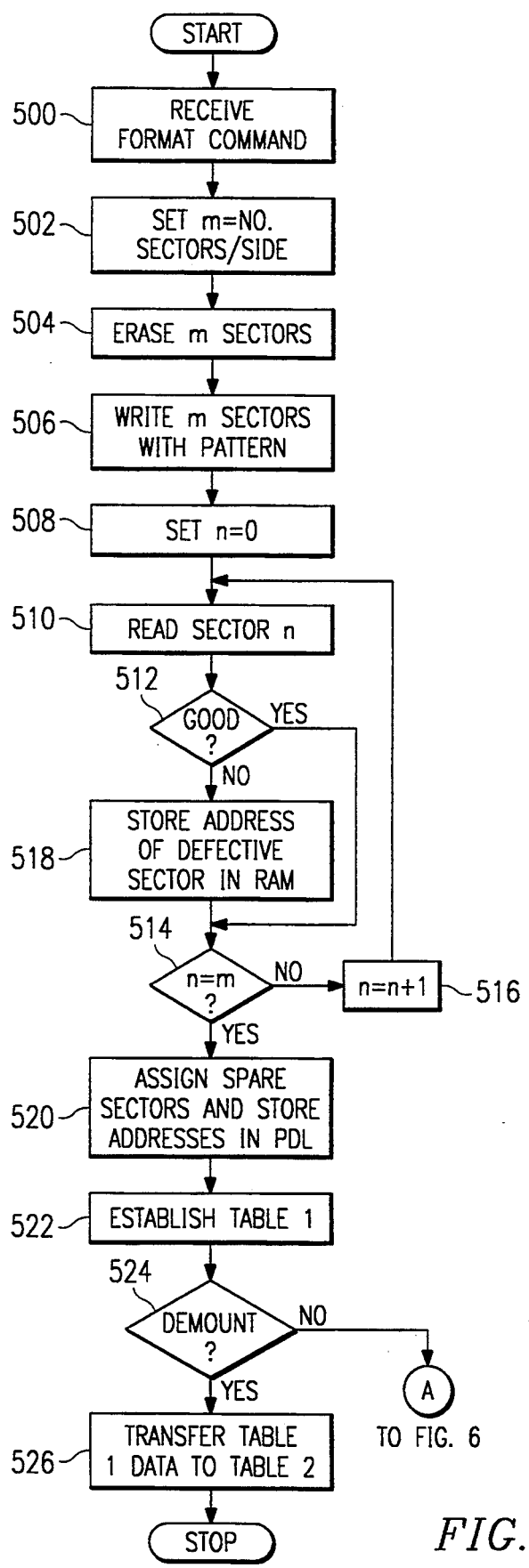
FIG. 5 is a flow chart of a surface analysis procedure for identifying defective sectors during a format operation.

FIG. 5 shows the surface analysis procedure for use in the original formatting process of a new MO disk. In step 500, the format command is received by the controller 10 from the host 14 and in step 502 a variable m is set equal to the number of sectors to be formatted per disk side. In step 504, all of the sectors on the disk side are erased and in step 506 a specific pattern is written to each of the sectors. In step 508 a variable n is set equal to zero and in step 510 sector n is read. In step 512 a query is answered as to whether the pattern data which had been written to sector n was read back correctly. If so, a determination is made in step 514 as to whether all sectors have been read. If not, the variable n is incremented to n+1 in step 516 and a return is made to read and verify the sector in step 510. When a defective sector is found in step 512, the address of that sector is stored in RAM 24 in step 518 before a return is made to step 510 to inspect the next sector. The surface analysis is complete in step 514 when the patterns have been written to all of the sectors and inspected.

The disk 32, if MO, includes a Disk Management Area (DMA) containing a Disk Definition Structure (DDS), a Primary Defect List (PDL) and a Secondary Defect List (SDL). It is assumed that the cartridge has remained sealed prior to the initial formatting of the disk, that there has been no dust contamination and that any errors found during the initial formatting were caused by permanent media defects. Upon completion of the surface analysis in step 514, defective sectors are assigned spare sectors as replacements. The addresses of the defective sectors and the corresponding assigned spare sectors are stored in the PDL area of the DMA structure in step 520. (Alternatively, spare sectors can be assigned, and addresses stored in the PDL, as defects are detected during the certification portion of the formatting process.)

In step 522, an error table is compiled in RAM 24 for the particular optical drive used to format the disk 32 as illustrated by the following Table 1:

TABLE 1

| Drive #23451 Error Statistics For This Mount | | | | | |
|---|---|---|---|---|---|
| Time Stamp | Operation | Sectors Proc'd. | Disk VOLID | Temp. Errors | Perm. Errors | Spares Used |
| 6/5/92 | Format | 318,767 | XXXX | 0 | 16 | 48 |

In this example, all 318,767 writable data and spare sectors of an optical MO disk with the volume identification XXXX were formatted in drive #23451. (The 318,767 writable sectors of an MO disk comprise 316,719 data sectors and 2048 spare sectors.) Sixteen permanent errors (media defects) were detected and assigned to 48 spare sectors.

If the disk is only to be formatted at this time, such as in a process to format all of the disks in a new optical library system, and is to be demounted as determined in step 524, the data from Table 1 is transferred in step 526 to a separate table which maintains error statistics for all of the disks and all of the drives (as in a library environment). The Table 1 data can then be deleted and new data added when another disk is mounted in the drive. The following Table 2 exemplifies a newly established table having only the single entry resulting from formatting disk XXXX on drive #23451:

TABLE 2

| Drive Error Statistics | | | | | |
|---|---|---|---|---|---|
| Time Stamp | Sectors Written | Disk VOLID | Temp. Errors | Perm. Errors | Spares Used | Drive Ser. # |
| 6/5/92 | 318,767 | XXXX | 0 | 16 | 48 | 23451 |

Tables 1 and 2 can be maintained in non-volatile storage, such as a hard disk, associated with either the library controller 38 or the host 14. Following the establishment or update of Table 2 with data from Table 1, additional disks can be formatted, the process ended or actual data recorded to the disk 32.

Figure 6:
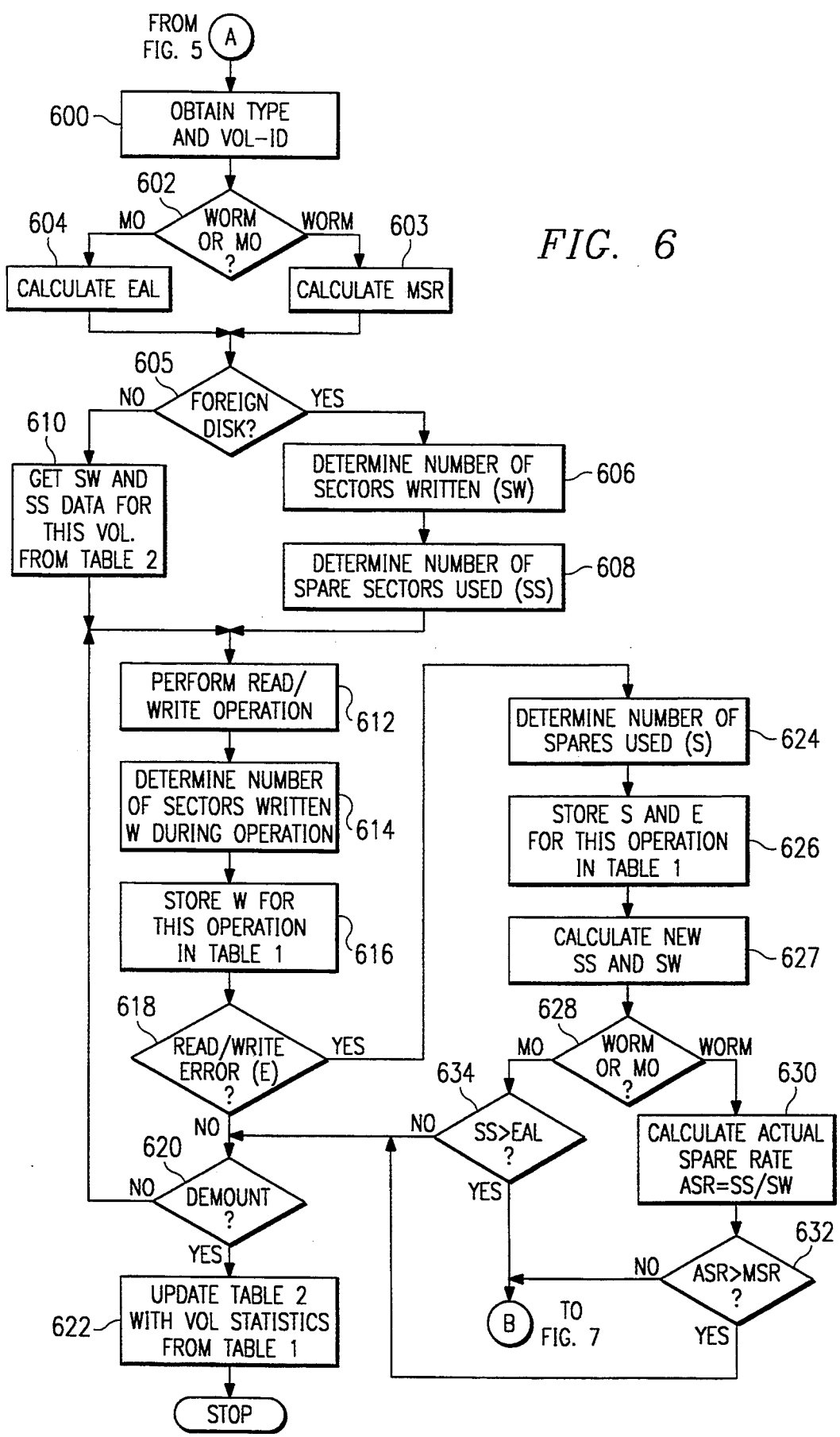
FIG. 6 is a flow chart of a procedure for determining whether overusage of spare sectors has occurred.

For MO or WORM media, if actual data is now to be recorded to the disk 32, no demount of the disk 32 is desired in step 524. For recording data to the disk 32, or for recording to or reading from a previously formatted disk, a new procedure is invoked, indicated by the arrow to A in FIG. 5 and set forth in the flow chart of FIG. 6. The disk type and volume identification code are obtained in step 600 and a spare threshold limit is calculated.

If the disk is WORM, as determined in step 602, a maximum acceptable rate of usage of secondary spare sectors (MSR) is calculated in step 603. This rate relates to the maximum number of secondary spare sectors (after the sixteen primary spare sectors per track have been used in each of 1156 groups of 256 sectors on each disk side) to which defective sectors will be allowed to be mapped, relative to the total number of data sectors available, before overusage is flagged. For WORM media:

$$MSR = (K * \text{Secondary Spares Available})/\text{Sectors Available} \quad \{Eq. 1\}$$

If it is desired, for example, that overusage of secondary spare sectors is indicated when one-half of the available secondary spares have been used (that is, K=50%), and the media has about 305K data sectors and 340 secondary spare sectors, then:

$$MSR = (.5*340)/305K = .00055$$

If the disk is MO, as determined in step 602, an erasable acceptable limit of usage of spare sectors (EAL) is calculated in step 604. This limit is the maximum number of secondary spare sectors to which defective sectors will be allowed to be mapped before overusage is flagged. For MO:

$$EAL = K * \text{Spares available} \quad (Eq. 2)$$

Again, if it is desired that overusage of secondary spare sectors be indicated when one-half of the available spares have been used (that is, K=50%), and the media has a maximum of 2048 spare sectors, then EAL=.5 * 2048=1024.

Following the calculation of acceptable spare usage in steps 603 or 604, a determination is made in step 605 whether the disk is "foreign" and not yet listed in Table 2. If the disk is foreign, the number of sectors already written SW to the disk and the number of spare sectors already used SS are obtained in steps 606 and 608 by performing a medium scan of the disk. If the disk is not foreign, the error statistics SW and SS for the volume are obtained from Table 2 in step 610.

Upon receipt of SW and SS in either step 608 or 610, the desired read or write operation is performed in step 612 and the number of sectors written W during the operation is obtained and stored in Table 1 in steps 614–616. A determination is also made in step 618 of whether a read or write error E occurred during the operation. As a disk is used over a significant period of time, the number of defective sectors can increase significantly. Not only can permanent errors from media defects expand and affect adjacent sectors, but dust particles which infiltrate the cartridge during use can cause temporary errors in areas not physically associated with the permanent errors.

If no new (or newly expanded) errors are detected in step 618, it is determined in step 620 whether the disk is now to be demounted. If so, Table 2 is updated in step 622 with any new statistics from Table 1 and the process ends. If the disk is not to be demounted but is to undergo further read or write operations, then the process returns to step 612.

On the other hand, if new errors are detected in MO media in step 618, the addresses of defective sector locations are stored in the SDL area in the DMA structure together with the address of their respective associated replacement sectors. Additionally, the number of spare sectors used S is calculated and stored in Table 1, along with the number of errors E, in steps 624 and 626. A separate Table 1 is created for each drive unit in a library environment each time a disk is mounted in the drive unit and an entry is made each time a new error is detected. An updated Table 1 for Drive #23451 might resemble the following after formatting and several read/write operations of the disk volume XXXX:

TABLE 1

| | Drive #23451 Error Statistics For This Mount | | | | |
|---|---|---|---|---|---|
| Time Stamp | Operation | Sectors Proc'd. | Disk VOLID | Temp. Errors | Perm. Errors | Spares Used |
| 6/5/92 | Format | 318,767 | XXXX | 0 | 16 | 48 |
| 6/5/92 | Write | 1,000 | XXXX | 0 | 1 | 3 |
| 6/5/92 | Read | 50 | XXXX | 0 | 0 | 0 |
| 6/5/92 | Read | 200 | XXXX | 1 | 0 | 1 |

The total number of spares used SS and sectors written SW are calculated from accumulated data in Tables 1 and 2 in step 627.

If the media is WORM (step 628), the actual rate of spare usage ASR is calculated in step 630:

$$ASR = SS/SW \quad \{Eq. 3\}$$

Optionally, if a large number of sectors are written in one operation, ASR can be calculated using only the latest entries to Table 1:

$$ASR' = S/W \quad \{Eq. 4\}$$

This can trigger an alert to overusage of spare sectors attributed to a particular drive sooner than if an ASR is calculated from accumulated data from Tables 1 and 2 (Eq. 3).

Then, in step 632, it is determined whether the actual rate ASR exceeds the maximum acceptable rate MSR. If ASR exceeds MSR in step 632, the procedure of FIG. 6 jumps to a diagnostic procedure indicated by the arrow to B in FIG. 6 and set forth in the flow chart of FIG. 7. If ASR is less than MSR, the procedure returns to step 620 for a demount determination.

If the disk is to be demounted, Table 2 is updated with Table 1 information in step 622. An updated Table 2 might resemble the following after transferring disk volume XXXX/drive #23451 data from Table 1 as well as after read/write operations of other disks and drives (including an operation in which disk XXXX was mounted in drive #33246):

TABLE 2

| | | Drive Error Statistics | | | | |
|---|---|---|---|---|---|---|
| Time Stamp | Sectors Written | Disk VOLID | Temp. Errors | Perm. Errors | Spares Used | Drive Ser. # |
| 1/9/92 | 50 | AAAA | 0 | 0 | 0 | 55467 |
| 2/2/92 | 200 | BBBB | 1 | 0 | 1 | 33246 |
| 6/5/92 | 318,767 | XXXX | 0 | 16 | 48 | 23451 |
| 6/5/92 | 1,250 | XXXX | 1 | 1 | 4 | 23451 |
| 6/5/92 | 1,000 | XXXX | 0 | 1 | 3 | 33246 |

If the media is MO and not WORM in step 628, it is determined in step 634 whether the total number of spares used SS exceeds the limit EAL. Again, optionally, if a large number of sectors are written, the number of spares used S with respect to the sectors written during only the latest operation can be compared with EAL. If the limit EAL is exceeded, the procedure of FIG. 6 jumps to the diagnostic procedure of FIG. 7. Otherwise, the procedure returns to step 620 for a demount determination as before.

Figure 7:
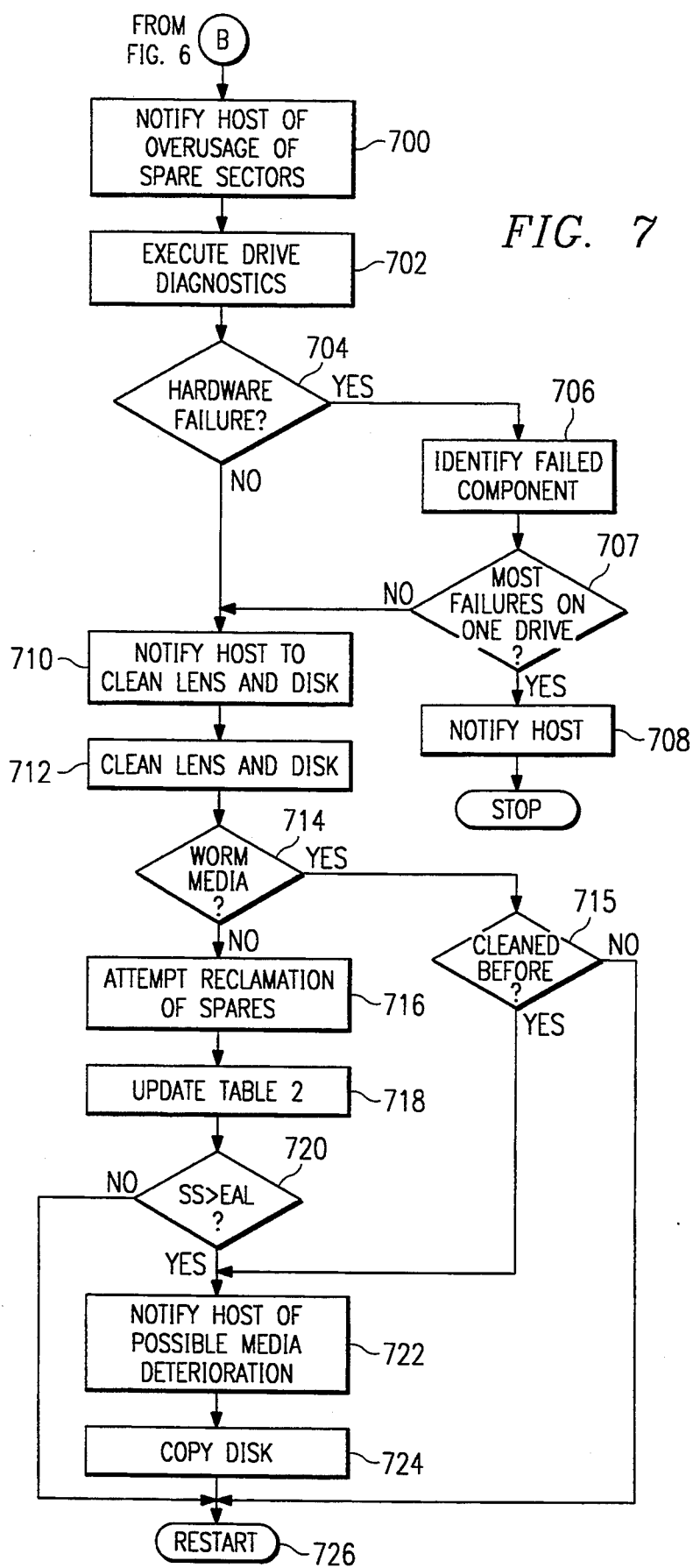
FIG. 7 is a flow chart of a procedure for determining a cause of overusage of spare sectors and for initiating corrective action.

Referring now to FIG. 7, when the number of spare sectors used exceeds the acceptable limit in step 632 or step 634, the host 14 is notified in step 700 and drive diagnostics are executed in step 702. If it is determined in step 704 that the cause of the overusage is a hardware failure, the failed component is identified in step 706. If a majority of the errors occur across multiple disks on one drive in a library (step 707), then the host is notified in step 708 for appropriate repairs to be initiated. If the problem is not a hardware failure, it is initially assumed that the disk or the drive lens, or both, need cleaning and the host is notified to initiate lens and disk cleaning in steps 710 and 712.

The next set of steps depends on which type of media is involved. If the disk is MO (step 714), an attempt is made in step 716 to reclaim defective data sectors and associated spare sectors. There are several techniques for reclaiming the sectors, three of which are suggested here. One is to consider the reclaimed data sectors as new spares; the second is to move customer data from the spare sectors back to the original, reclaimed, sectors on the disk; and the third is to restore the reclaimed sector to the user area for future write operations while leaving the user data in the spare area.. When, during a reclamation process, data is to be written back from a spare sector to the associated data sector, as in the second suggested technique, the rewritten data verified and, if valid, the SDL is corrected and Table 1 updated. If the data written to any associated data sector is invalid, that reclamation is considered unsuccessful, the cause assumed to be defective media, and no change to the SDL or Table 1 is made. After reclaiming as many spares as possible in step 716, Table 2 is updated in step 718.

After cleaning and reclamation (if MO media), a determination is made in step 720 whether the problem still exists by again determining whether $SS \geq EAL$. If the problem has been corrected and the spare sector usage is below the allowable limit, the process restarts in step 726 for further operations. If the problem remains, the host is notified in step 722 of possible media deterioration (probably caused by growth in permanent defects). To preserve the data on the disk, it is copied onto a new disk in step 724 (after formatting, if necessary) and the process begins again in step 726.

If the disk is WORM (step 714), then defective data sectors and associated spare sectors cannot be reclaimed and reused. Instead, a determination is made in step 715 whether the disk had previously been cleaned. If the disk was cleaned before and if, after reading or writing, there continues to be a problem with the media, it is recommended that the disk be copied. Therefore, the host is notified, the disk copied and the procedure restatted in steps 722–726. If the disk had not been previously cleaned, the procedure is restarted in step 726.

While the invention has been particularly shown and described with reference to preferred embodiments thereof, it will be understood by those skilled in the art that various changes in form and details may be made therein without departing from the spirit and scope of the invention:

What is claimed is:

1. An automated storage and retrieval system for optical storage disks, comprising:
   an array of cells for storing a plurality of optical disks, each of the optical disks having a first number X of data sectors and a second number Y of spare sectors to replace data sectors found to be defective;
   a drive for recording and reproducing information to and from a selected one of the optical disks;
   an accessor for transporting the selected optical disk between one of said cells and said drive;
   a non-volatile memory for storing a table containing an entry for each operation in which the selected optical disk has data written on sectors thereon, each entry having an identification of the selected optical disk, an identification of said drive, the number of sectors written to the selected optical disk, the number of errors encountered during the operation and the number of spare sectors assigned to replace defective sectors in response to the errors; and
   a system controller interconnected to receive control instructions from a host device and direct actions of said accessor and said drive in response thereto, said system controller comprising:
      means for calculating a limit Z on the number of spare sectors which can be assigned to replace defective sectors on the selected optical disk before an indication of overusage is generated;
      means for calculating from the table the total number SW of sectors to which information has been recorded on the selected optical disk and the total number SS of spare sectors on the selected optical disk which have been assigned to replace defective sectors on the selected optical disk; and
      means for generating an overusage indication if the number of assigned spare sectors SS exceeds the limit Z.

2. The system of claim 1, wherein said non-volatile memory comprises a hard disk.

3. The system of claim 1, wherein said system controller further comprises means for determining whether the selected optical disk is a rewritable disk or a write-once disk.

4. The system of claim 3, wherein, if the selected disk is a write-once disk:
   said means for calculating the limit Z comprises means for calculating a rate MSR to be $K*Y/X$, where K is greater than 0 and less than or equal to 1; and
   said system further comprises means for calculating an actual rate of spare usage ASR to be SS/SW and means for comparing ASR to MSR;
   wherein said means for generating an overusage indicator comprises means for generating the overusage indicator if ASR exceeds MSR.

5. The system of claim 4, further comprising means for cleaning the selected optical disk in response to the overusage indicator.

6. The system of claim 3, wherein, if the specific disk is a rewritable disk:
   said means for calculating the limit Z comprises means for calculating a rate EAL to be $K*Y$, where K is greater than 0 and less than or equal to 1; and
   said system further comprises means for comparing SS with EAL;
   wherein said means for generating an overusage indicator comprises means for generating the overusage indicator if SS exceeds EAL.

7. The system of claim 6, further comprising:
   means for cleaning the selected optical disk in response to the overusage indicator;
   means for attempting reclamation of spare sectors previously assigned to replace defective data sectors;
   means for updating the number SS after the attempted reclamation; and
   means for generating a media deterioration signal if the updated SS exceeds EAL.

8. A method of determining overusage of spare sectors on an optical disk, comprising the machine-implemented steps of:
   mounting an optical disk into an optical disk drive, the optical disk having a first number X of data sectors and a second number Y of spare sectors to replace data sectors found to be defective;
   calculating a limit Z on the number of spare sectors which can be assigned to replace defective sectors on the optical disk before overusage of spare sectors is indicated;
   performing a sector accessing operation on the optical disk;
   detecting whether any accessed sectors are defective;
   if defective sectors are detected, assigning spare sectors to replace the defective sectors;
   adding an entry to a table in a non-volatile memory, the entry having an identification of the optical disk, an identification of the optical disk drive, the number of sectors written to the optical disk, the number of defective sectors encountered during the sector accessing operation and the number of spare sectors assigned to replace defective sectors;
   determining a total number of spare sectors which have been assigned to replace defective sectors on the optical disk;
   comparing the total number to the calculated limit Z; and
   generating an overusage indication if the total number exceeds the calculated limit Z.

9. The method of claim 8, further comprising the step of determining whether the optical disk is a write-once disk or a re-writable disk.

10. The method of claim 9, wherein, if the optical disk is a write-once disk:
    said step of calculating a limit Z comprises the step of calculating a rate MSR to be equal to $K*Y/X$, where K is greater than 0 and less than or equal to 1;
    said step of determining the number of spare sectors assigned comprises the step of determining an actual rate of spare usage ASR to be SS/SW, where SS is the total number of spare sectors assigned and SW is the total number of data sectors written; and said comparing step comprises comparing ASR to MSR.

11. The method of claim 10, further comprising the steps of:

cleaning the optical disk; and generating a media deterioration signal if the optical disk is a write-once disk and has previously been cleaned.

12. The method of claim 9, wherein, if the optical disk is a re-writable disk:

said step of calculating a limit Z comprises the step of calculating a number EAL to be equal to K*Y, where K is greater than 0 and less than or equal to 1; and said comparing step comprises the step of comparing the total number of assigned spare sectors to EAL.

13. The method of claim 12, further comprising the steps of:

attempting to reclaim assigned spare sectors after said step of cleaning the optical disk if the optical disk is a rewritable disk;

determining an update value for the number SS;

comparing the Updated number SS to EAL; and generating a media deterioration signal if the updated SS exceeds EAL.

14. The method of claim 8, further comprising the steps of:

executing drive diagnostics when an overusage indication is generated; and cleaning at least a portion of an optical head in the optical disk drive.

* * * * *

UNITED STATES PATENT AND TRADEMARK OFFICE
CERTIFICATE OF CORRECTION

PATENT NO. : 5,418,767
DATED : May 23, 1995
INVENTOR(S) : Andrew A. Gaudet, et. al.

It is certified that error appears in the above-indentified patent and that said Letters Patent is hereby corrected as shown below:

At column 8, Table 2, line 9, "6/5/92" should be ---6/8/92---.

At column 9, line 7, "restatted" should be ----restarted---.

At column 12, line 9, "Updated" should be ---updated---.

Signed and Sealed this

Fifth Day of September, 1995

Attest:

BRUCE LEHMAN

*Attesting Officer*     *Commissioner of Patents and Trademarks*